United States Patent
Stange, Jr.

[11] Patent Number: 5,561,912
[45] Date of Patent: Oct. 8, 1996

[54] THREE AXIS GONIOMETER

[75] Inventor: Horst Stange, Jr., Park Ridge, Ill.

[73] Assignee: Buehler Ltd., Lake Bluff, Ill.

[21] Appl. No.: 323,533

[22] Filed: Oct. 14, 1994

Related U.S. Application Data

[63] Continuation of Ser. No. 191,727, Feb. 4, 1994, abandoned, which is a continuation of Ser. No. 889,810, May 28, 1992, abandoned.

[51] Int. Cl.⁶ .................. B23Q 15/013; B23Q 3/04
[52] U.S. Cl. .................. 33/573; 33/569; 33/640; 83/953; 83/411.3; 83/412; 269/58; 269/71
[58] Field of Search .................. 33/573, 568, 569, 33/630, 1 M, 570, 640; 83/953, 412, 410.8, 411.3, 411.4; 269/45, 58, 71, 73

[56] References Cited

U.S. PATENT DOCUMENTS

| | | | |
|---|---|---|---|
| 2,538,640 | 1/1951 | Click | 269/71 |
| 2,564,566 | 8/1951 | Duffy | 269/71 |
| 2,923,179 | 2/1960 | Pierce | 269/84 |
| 3,433,105 | 3/1969 | Barickman | 83/953 |
| 3,881,888 | 5/1975 | Schwab | 269/71 |
| 4,253,649 | 3/1981 | Hewson | 269/45 |
| 4,942,795 | 7/1990 | Linke et al. | 83/72 |

OTHER PUBLICATIONS

"The MG Head", M. L. Gotwalt Co. Brochure, York, Penna. Nov. 1956.

*Primary Examiner*—Christopher W. Fulton
*Attorney, Agent, or Firm*—Banner & Allegretti, Ltd.

[57] ABSTRACT

A goniometer arm for use in conjunction with a precision cutting apparatus comprising an arm for supporting a rotating adaptor arm which in turn supports and secures a rotating disc and a specimen holder. The goniometer arm allows a specimen to be cut along a specific plane about a specific axis.

11 Claims, 2 Drawing Sheets

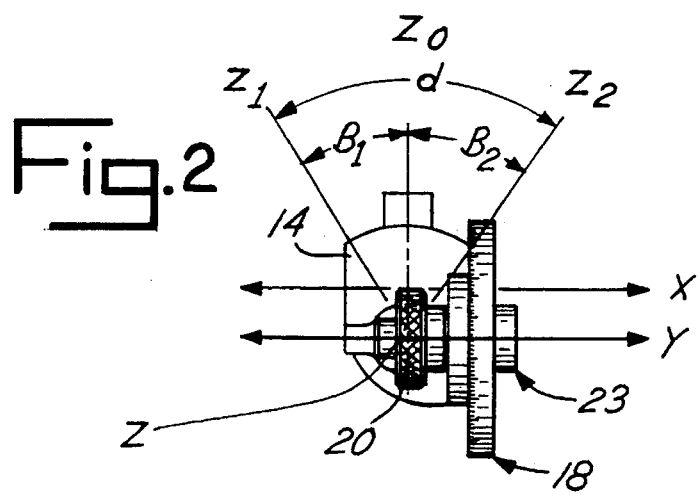
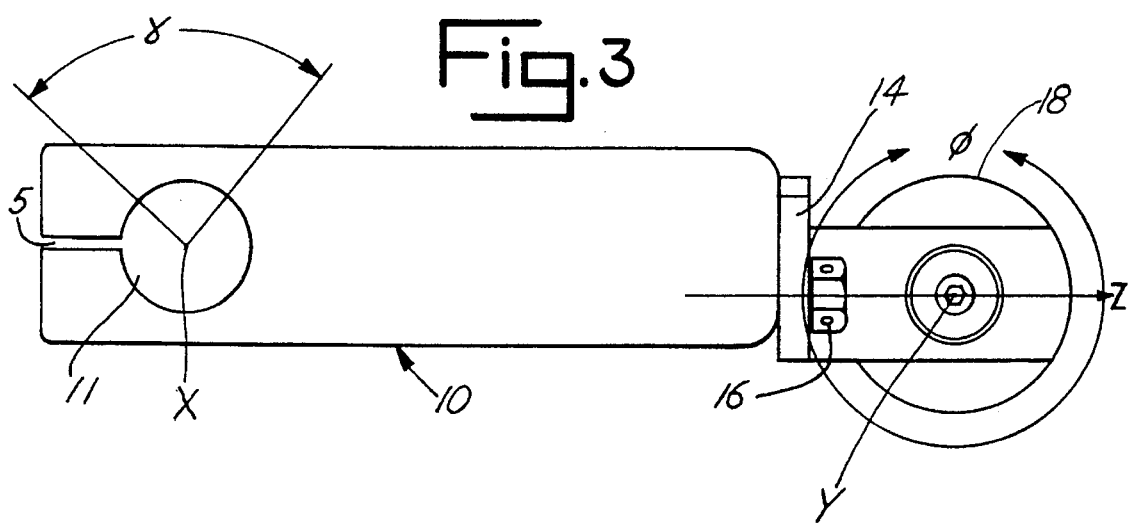
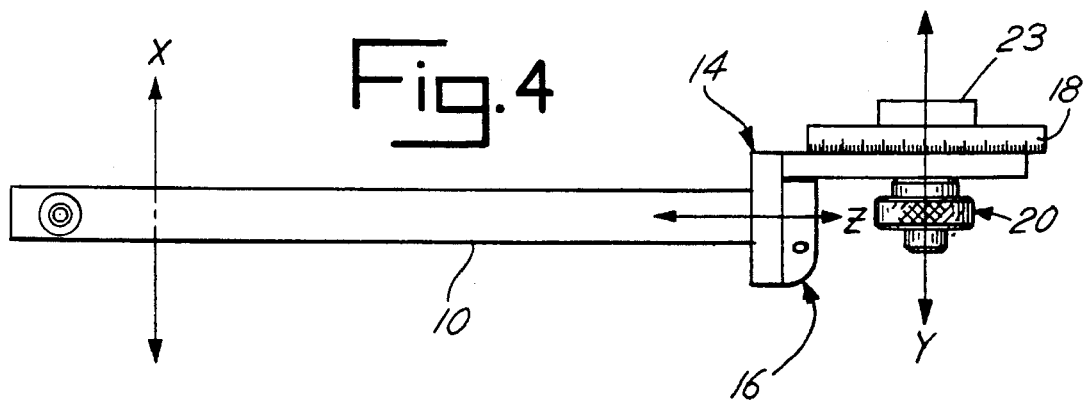

THREE AXIS GONIOMETER

This application is a continuation of application Ser. No. 08/191,727, filed Feb. 4, 1994, now abandoned, which is a continuation of application Ser. No. 07/889,810, filed May 28, 1992, now abandoned.

BACKGROUND OF THE INVENTION

1. Field of the Invention

This invention relates to a goniometer arm that is adaptable to a stationary precision saw apparatus. The goniometer arm positions a sample specimen in any plane in relation to the stationary saw apparatus, allowing the saw to cut the sample specimen in any planar direction.

2. Summary of the Related Art

Linke, et al. U.S. Pat. No. 4,942,795 describes a precision saw including an automated pressure control. The pressure control operates in conjunction with a specimen holding arm to precisely cut a specimen for analysis.

The holding arm described in the '795 patent is rotatable only about a first axis that is centered on a shaft integral to the precision cutting device. The '795 patent therefore fails to disclose an arm that is able to rotate a sample about two or three separate axes.

Other apparatuses for presenting a sample to a precision saw blade are known in the art. Some of the apparatuses use an arm rotatable about a single axis and some use an arm that is rotatable about two axes including an axis centered on a shaft integral to a cutting apparatus. The art, however, is devoid or any description of a goniometer arm that is able to rotate about two axes other than the axis integral to the cutting apparatus so as to present a sample, at any angle, to a saw blade for cutting.

SUMMARY OF THE INVENTION

It is an object of this invention to provide a three axis goniometer arm that is capable of holding and positioning a sample at any angle desired in relation to a saw blade.

It is another object of this invention to provide a goniometer arm that is capable of rotation about two different axes, a Y-axis and a Z-axis.

It is yet another object of this invention to provide a goniometer arm that is capable of rotating about three different axes, an X-axis, a Y-axis, and a Z-axis.

Another object of this invention is a process for using a goniometer arm to orient a specimen for precision cutting.

In one embodiment, this invention is a goniometer arm comprising an arm support adaptable to a saw apparatus, an adapter arm attached to an arm support, the adapter arm is partially rotatable about a Z-axis. The adapter arm supports a rotating disc that is rotatable about a Y-axis. The rotating disc supports a specimen mount, and the Y-axis and Z-axis are located on the same plane.

In yet another embodiment, this invention is a goniometer arm comprising an arm support including an aperture and a screw for clamping the arm support to a shaft integral to a saw apparatus, the arm support at least partially rotatable about an X-axis and indexable along the same X-axis. The goniometer arm also includes an adapter arm rotatably attached to the arm support with a compression lock. The adapter arm rotates approximately 60° about a Z-axis. A rotating disc is attached to the adapter arm with a compression nut and is rotatable 360° about a Y-axis. The rotating disc supports a moveable specimen mount. This allows a specimen to be positioned so that it can be sliced accurately along a predetermined plane with a saw.

In another embodiment, this invention is a method of using a goniometer arm to orient a specimen for a precision cut. The method comprises the steps of: attaching a specimen to a specimen mount; securing the arm support of the goniometer arm to a cutting apparatus; adjusting the orientation of an adaptor arm about a Z-axis; and adjusting the orientation of the rotating disc about a Y-axis.

DESCRIPTION OF THE DRAWINGS

FIG. 2 is a front view of the goniometer arm of this invention.

FIG. 3 is a side view of the goniometer arm of this invention.

FIG. 4 is a top view of the goniometer arm of this invention.

DESCRIPTION OF THE PREFERRED EMBODIMENT

Figure 1:
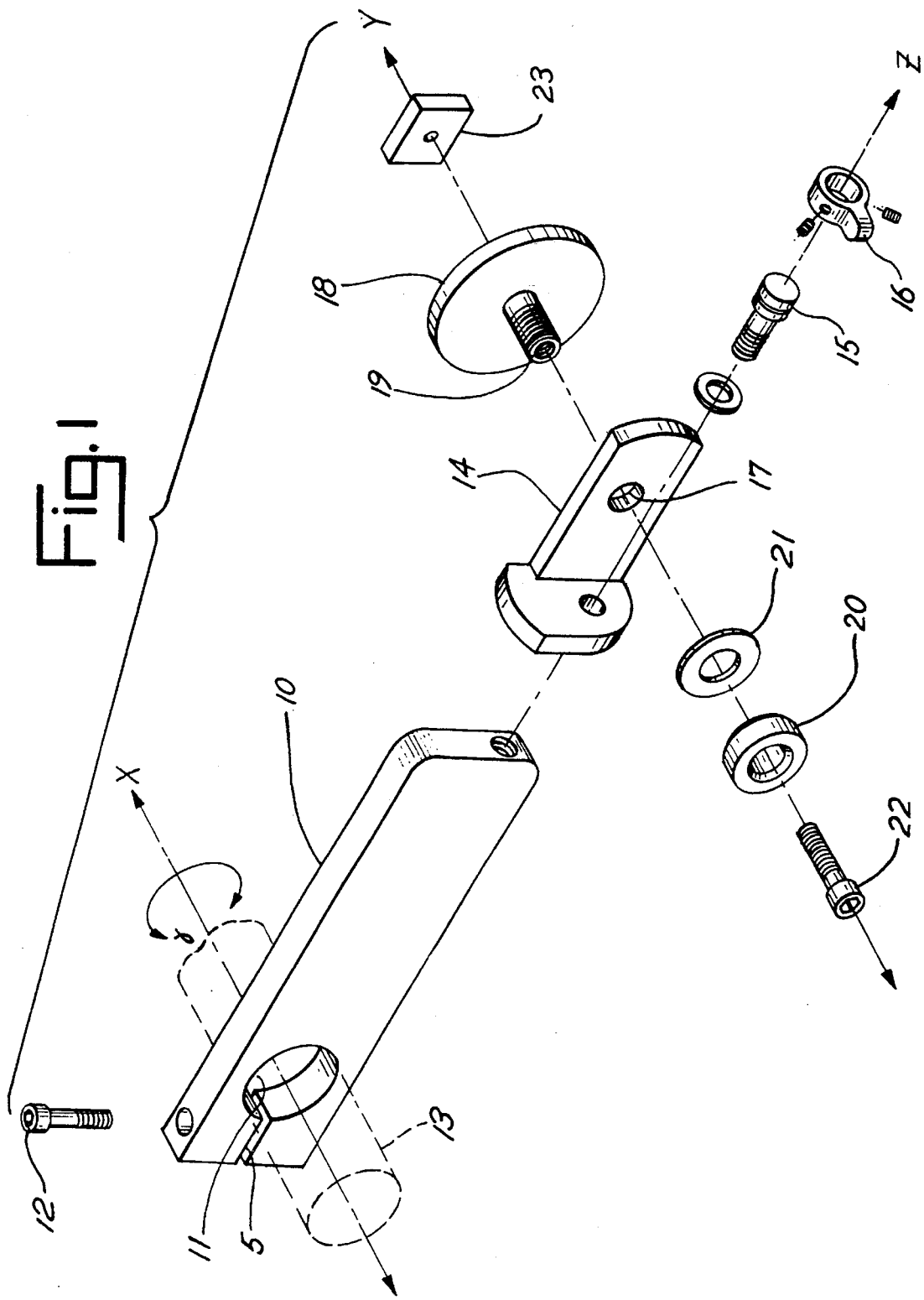
FIG. 1 is an isometric view of a goniometer arm of this invention with parts broken away.

Referring to the drawings, FIG. 1 is an elevation view of a goniometer arm of this invention with parts broken away. FIGS. 2–4 are front, side and top views respectively of the goniometer arm of this invention. The goniometer arm of this invention comprises an arm support 10 which includes an aperture 11 and lock screw 12. Aperture 11 is complementary to cutting arm support shaft 13 which is integral to a cutting apparatus. Cutting arm support shaft 13 is placed through aperture 11 until arm support 10 is located in the desired lateral location on cutting arm support shaft 13. At this point, lock screw 12 is placed in the lock screw hole and tightened until the two edges of arm support 10 which define slot 5 abut one another thereby securing arm support 10 to cutting arm support shaft 13.

At this point, arm support 10 is firmly attached to cutting arm support shaft 13. Cutting arm support shaft 13 is pivotable or rotatable about an X-axis which is located in the center of round cutting arm support shaft 13. The location of arm support 10 along cutting arm support shaft 13 can be changed by loosening lock screw 12 and indexing arm support 10 along the length of cutting arm support shaft 13, or rotating arm support 10 about arm support shaft 13.

Arm support 10 of the goniometer arm of this invention may be attached to any type of saw apparatus. Generally, the saw apparatus of this invention is similar in structure and function to the ISOMET brand low speed precision saw which is currently available from Buehler, Ltd. An example of such a low speed saw is found in U.S. Pat. No. 4,942,795 the specification of which is incorporated herein by reference.

Arm support 10 of this invention need not include aperture 11. Instead, arm support 10 could, for example, include a shaft complementary to an aperture in a cutting apparatus. Therefore, any method known in the art for providing a rotatable and indexable coupling may be used to unite arm support 10 with a cutting apparatus.

An adapter arm 14 is rotatably attached to the end of arm support 10 furthest from aperture 11. Adapter arm 14 is preferably attached to arm support 10 by the combination of a compression lock screw 15 and a lock 16. The lock screw 15 passes through an aperture in the adapter arm and into a complementary aperture in arm support 10. Compression lock screw 15 mechanically unites adapter arm 14 with arm support 10. Lock 16 acts in conjunction with compression lock screw 15 to lock adapter arm 14 in a desired cutting position thereby preventing adapter arm 14 from rotating.

As shown in FIGS. 2, 3 and 4, adapter arm 14 is rotatable about a Z-axis. However, adapter arm 14 is not rotatable for 360° about the Z-axis. Instead, adapter arm 14 has a total arc of rotation of Alpha wherein Alpha is equal to Beta-1 plus Beta-2. Beta-1 represents the arc of rotation of adapter arm 14 in one direction from $Z_0$ to $Z_1$ while Beta-2 represents the arc of the rotation of the adapter arm 14 from $Z_0$ to $Z_2$. The maximum arc of rotation, Alpha, of adapter arm is about 60°. Therefore, Beta-1 and Beta-2 are each about 30°. $Z_0$ represents the rotational point of adaptor arm 14 where rotating disc 18 is parallel to the X-axis or vertical.

Rotating disc 18 is rotatably attached to adapter arm 14. In a preferred embodiment, rotating disc 18 includes a shaft 19 which passes through aperture 17 in adapter arm 14. Rotating disc 18 has an arc of rotation of 360° about shaft 19. Rotating disc 18 is mechanically attached to adapter arm 14 using compression nut screw 22 and compression nut 20. Rotating disc 18 abuts a first side of adapter arm 14 while washer 21 and compression nut 20 abuts a second side of adapter arm 14. Shaft 19 passes through aperture 17 in the adapter arm 14 and is secured by washer 21 and nut 20 so that after disc 18 is rotated to any desired rotational position about axis Y, it can be fixed in a desired position for a sawing operation or cutting operation. Screw 22 passes through the interior of shaft 19 so it can be threaded into an opening in specimen mount 23 to secure the latter in a fixed position on disc 18.

A specimen mount 23 is secured to a first face of rotating disc 18. The first face is opposite a second face that includes shaft 19. The specimen mount may be mechanically attached to rotating disc 18 or it may be glued or attached to rotating disc 18 in some other manner.

Rotating disc 18 has a 360° range of rotation about a Y-axis. The Y-axis passes through the center of shaft 19. Rotating disc 18 may also include a scale indicating the position of rotating disc 18 from an arbitrary zero point. Preferably the scale is divided into degrees from 0° to 360° thereby allowing the goniometer arm operator to accurately rotate rotating disc 18. Rotating disc 18 may be continuously rotatable or it may be releasably locked into a specific position.

The goniometer arm of this invention is used by first securing arm support 10 of the goniometer arm to cutting arm support shaft 13 using lock screw 12. Before securing arm support 10 to cutting arm support shaft 13, however, the goniometer arm may be indexed along a X-axis which runs through the center of cutting arm support 13 or the goniometer arm may be rotated about the X-axis. When arm support 10 is located in its desired position, locking screw 12 is tightened to secure arm support 10 to cutting arm support shaft 13. At this point, goniometer arm support 10 is immobile relative to shaft 13. However, the entire goniometer arm can still rotate about the X-axis by virtue of the rotation of cutting arm support shaft 13.

A specimen is then located on specimen mount 23 by any means known in the art. Preferably a specimen is mounted to specimen mount 23 with an adhesive. For the goniometer arm to work properly, the specimen must be securely fixed to specimen mount 23. It is not critical where the specimen is located on the specimen mount. What is important is that the specimen be located on the specimen mount before the specimen is cut by the cutting apparatus.

The adapter arm 14 position and the rotating disc 18 position may be now adjusted to place the specimen in the desired position in relation to the saw blade. The saw blade is typically oriented perpendicular to cutting arm support 13 and parallel to the Z-axis. Adapter arm 14 can be rotated about the Z-axis about 30° in either direction from center, $Z_0$, or 60° overall. Adapter arm 14 is adjusted by loosening or removing lock 16. This allows adaptor arm 14 to rotate about the Z-axis. When the adapter arm is in the desired position, the compression lock screw 15 is locked into place with lock 16 thereby preventing further rotation of adapter arm 14.

Finally, compression nut screw 22 is unloosened allowing rotating disc 18 to rotate about the Y-axis. The arc of rotation of rotating disc 18 is 360° about the Y-axis. Rotating disc is 18 rotated until the specimen mount 23 and specimen are in the desired orientation with respect to the saw blade. At this point, compression nut screw 22 is tightened fixing the position of rotating disc 18.

By adjusting the position of the goniometer arm on the X-axis, Y-axis and Z-axis, a specimen can be set to any given plane within the rotating means of the goniometer. Once the goniometer arm is properly positioned, the goniometer rotates through a cutting arc provided by the rotation of the cutting arm support shaft 13 of the precision cutter.

The operation of the goniometer arm of the present invention will now be described. In this respect, reference is made to the above-mentioned Linke et al. U.S. Pat. No. 4,942,795 which in FIG. 1 shows an arm support 14 having an attachment 16 for holding a chuck to grip an object to be sawed. Referring to the lower right-hand end of the support arm 14, a shaft (not numbered) corresponding to applicant's cutting arm support shaft 13 is shown, as is a slot at the end of the arm where it clamps on the support shaft as in applicant's invention. It will be understood from FIG. 1 of the Linke et al. '795 patent that the center of the support shaft comprises a pivot axis for the support arm 14.

As is fully explained in the Linke et al. '795 patent (see FIG. 1), a rotatable saw 12 is provided for sawing a workpiece carried on the left end of support arm 14. The saw is positioned in a vertical plane and rotates about its central axis, but it is otherwise stationary. During a sawing operation, the support arm 14 pivots in a counterclockwise direction to move the workpiece down into the saw, and such movement continues until a complete slice through the workpiece has been made.

The Linke et al. '795 patent teaches (see col. 5, line 18) that the support arm 14 may be moved transversely or along its axis of rotation relative to the saw blade 12 for the purpose of varying the thickness of a slice sawed from a workpiece. However, the foregoing patent does not teach any mechanism for adjusting the plane of such a slice. With the present invention, it is possible to control the positioning of a sample or workpiece at a precise angle for sectioning along a specific plane.

Referring now to FIG. 1 of applicant's drawings, the saw blade is not shown, but it will be understood that during a sawing operation the support arm 10 will pivot about the X axis so that a specimen or sample carried on the specimen mount 23 will be moved in an arcuate path down into a saw blade which rotates but is otherwise stationary. As in the case of the Linke et al. '795 patent, the arm support 10 can be adjusted laterally on support shaft 13 to control the thickness of a slice sawed from a specimen. However in accordance with the present invention, two additional axes of rotation are provided to afford important adjustment not taught by the prior art.

Referring to FIGS. 1–4, the adapter arm 14 can be pivoted about the Z axis in either direction from the vertical position shown in FIG. 1. As explained above, such pivoting is possible up to 30 degrees in either direction from the center position. Once such adjustment is made to a desired position, the locking members 15 and 16 are used to fix the adapter arm in its selected position for a sawing operation.

In addition, the disc !8 which is fixed to the side of the adapter arm 14 can be rotated about the Y axis to any desired position, after which the disc 18 is fixed in a selected rotational position by the locking members 19 and 20 to fix the disc 18 in a selected position for a sawing operation.

Because a sample or workpiece is carried on the outside of specimen mount 23, each of the foregoing adjustments alters the orientation of the workpiece. Thus, when the adapter arm 14 is in its neutral or vertical position shown in FIG. 1, the specimen mount is in a similar position. However, once the adapter arm 14 is pivoted about axis Z, the plane of the specimen mount 23 is similarly adjusted or tilted along with the workpiece. In addition, when the disc 18, which would then itself be in a tilted or non-vertical plane, is rotated, the orientation of the workpiece is again changed.

It is well known that workpieces will often be of an irregular shape. Nevertheless, with the present three axis goniometer, any workpiece can be positioned at a precise angle for sectioning along a specific plane, an advantage not offered by prior art saws. Thus, by adjusting the arm support 10 to a desired position along the X axis, adjusting the adapter arm 14 to a desired rotational position about the Z axis, and adjusting the disc 18 to a desired rotational position about the Y axis, it is possible to position a workpiece for slicing by a saw blade through any desired plane of the workpiece.

The above has been offered for illustrative purposes only, and is not intended to limit the scope of this invention of this application, which is defined in the claims below.

What I claim is:

1. For use with a precision saw for slicing through a microstructural sample, said saw having a saw blade which is rotatable but otherwise stationary during a sawing operation and having a support shaft which is rotatable about an X axis, an arm support generally perpendicular to said X axis and carried at one end on said support shaft and having a sample mount carried at its opposite end whereby pivoting of said arm support about said X axis will cause a sample to be moved into the path of said saw blade for sawing through said sample, the improvement comprising, in combination, an adapter arm adjustably mounted on said opposite end of said arm support and being pivotable about a Z axis which is generally parallel to said arm support, first locking means which releasably locks said adapter arm to said arm support in a selected pivoted position about said Z axis, a rotatable member carried on said adapter arm and rotatable about a Y axis which is generally perpendicular to said adapter arm, second locking means for releasably locking said rotatable member to said adapter arm in a selected rotatable position about said Y axis, and said sample mount being carried on said rotatable member in a fixed position relative thereto, whereby a sample carried on said sample mount can be positioned at precise angles for sawing through specific planes.

2. The improvement defined in claim 1 where said adapter arm has a first portion which is attached directly to said arm support and a second portion which carries said rotatable member.

3. The improvement defined in claim 1 where said rotatable member comprises a rotatable disc.

4. The improvement defined in claim 3 where said rotatable disc is capable of 360 degree adjustable movement about said Y axis.

5. The improvement defined in claim 1 where said adapter arm can be pivoted 30 degrees in either direction about said Z axis from a central position.

6. The improvement defined in claim 5 where said Y and Z axes intersect and define a horizontal plane when said adapter arm is in said central position.

7. The improvement defined in claim 1 where said Y axis and said Z axis intersect.

8. The improvement defined in claim 1 where said arm support can be adjustably positioned on said support shaft along said X axis to adjust the thickness of a slice to be sawed from said sample.

9. A method for orienting a microstructural sample at precise angles for sectioning along specific planes using an arm support, an adapter arm, and a rotatable member, said method comprising the steps of attaching said adapter arm to an outer end of said arm support, attaching a rotatable member to said adapter arm, attaching a sample mount to said rotatable member, mounting a sample on said sample mount, rotating said adapter arm about a Z axis to a selected position and releasably fixing it in that position to said arm support, rotating said rotatable member about a Y axis to a selected position and releasably fixing it in that position to said adapter arm, and moving said arm support about an X axis at an inner end thereof to bring said sample into the path of a saw blade which is rotated but otherwise maintained stationary during a sawing operation.

10. A method as defined in claim 9 including the step of adjustably positioning said arm support along said X axis to adjust the thickness of a slice to be sawed from said sample.

11. A method as defined in claim 9 where said Y axis and said Z axis intersect.

* * * * *